(12) United States Patent
Edlund

(10) Patent No.: US 7,476,455 B2
(45) Date of Patent: Jan. 13, 2009

(54) PORTABLE FUEL CELL SYSTEM

(75) Inventor: David Edlund, Bend, OR (US)

(73) Assignee: Protonex Technology Corporation, Southborough, MA (US)

( * ) Notice: Subject to any disclaimer, the term of this patent is extended or adjusted under 35 U.S.C. 154(b) by 262 days.

(21) Appl. No.: 11/484,514

(22) Filed: Jul. 10, 2006

(65) Prior Publication Data

US 2008/0008914 A1    Jan. 10, 2008

(51) Int. Cl.
*H01M 8/04* (2006.01)
*H01M 8/06* (2006.01)

(52) U.S. Cl. .......................................... 429/20; 429/26
(58) Field of Classification Search ................... None
See application file for complete search history.

(56) References Cited

U.S. PATENT DOCUMENTS

| | | | |
|---|---|---|---|
| 5,266,080 A * | 11/1993 | Kiovsky et al. | ............... 44/312 |
| 6,989,134 B2 | 1/2006 | Tonkovich et al. | |
| 7,014,835 B2 | 3/2006 | Mathias et al. | |
| 7,029,647 B2 | 4/2006 | Tonkovich et al. | |
| 7,250,151 B2 | 7/2007 | Tonkovich et al. | |
| 2005/0014043 A1 * | 1/2005 | Kozu et al. | ..................... 429/22 |
| 2006/0014069 A1 * | 1/2006 | Kaye et al. | ..................... 429/34 |
| 2006/0127719 A1 * | 6/2006 | Brantley et al. | ............... 429/20 |

OTHER PUBLICATIONS

The International Search Report in PCT/US07/15543 dated Jun. 4, 2008.
The Written Opinion in PCT/US07/15543 dated Jun. 4, 2008.
Tonkovich, et al, "Microchannel Chemical Reactors for Fuel Processing"; Proceedings of the Second International Conference of Microreaction Technology, Mar. 1998, New Orleans, La., pp. 186-195.

* cited by examiner

*Primary Examiner*—Jonathan Crepeau
(74) *Attorney, Agent, or Firm*—Christine C. O'Day; George N. Chaclas; Edwards Angell Palmer & Dodge LLP

(57) ABSTRACT

A self-contained portable fuel cell system is described capable of economically generating a nominal 12 V of DC electrical power.

20 Claims, 9 Drawing Sheets

PORTABLE FUEL CELL SYSTEM

BACKGROUND OF THE INVENTION

Fuel cells are electrochemical devices that produce direct current (DC) electricity by the reaction of a fuel with an oxidant, typically producing byproducts of heat and water. Common fuels are hydrogen, methanol, and carbon monoxide; however, carbon monoxide can only be used as a fuel in high-temperature fuel cells operating at temperatures >400° C. The most common oxidant is oxygen, either in a relatively pure form or from air. Fuel cells contain an anode, a cathode, and an electrolyte barrier between the anode and cathode. The fuel is introduced at the anode and the oxidant is introduced at the cathode. The electrolyte barrier, commonly referred to as a membrane-electrode assembly or MEA, is an ionically conductive thin barrier that is relatively impermeable to the fuel and oxidant, and is electrically insulating. Known fuel cell designs and operating principles are described in, for example, The Fuel Cell Handbook, 7th Edition (2004) published by the US Department of Energy, EG&G Technical Services under contract DE-AM26-99FT40575.

Many configurations of fuel cell systems are known. Portable fuel cell systems are based on several different types of fuel cells, including proton-exchange membrane fuel cells (PEMFC) that operate at temperatures less than 85° C. and that use high-purity hydrogen as the fuel; PEMFCs that operate at temperatures in the 135° C. to 200° C. range and that use hydrogen-rich reformate as the fuel; direct methanol fuel cells (DMFC) that operate at temperatures less than 85° C. and that use methanol as the fuel; and solid oxide fuel cells (SOFC) that operate at temperatures in the range of 500° C. to 900° C. and that use hydrogen-rich reformate as the fuel.

Protonex Technology Corporation of Southborough, Mass. is developing a family of PEMFCs that operate at temperatures less than 85° C. and that use high-purity (>99%) hydrogen that are designed to generate from 30 W to 500 W. Protonex has teamed with Millennium Cell to couple a sodium borohydride hydrogen generator to the fuel cell. The Millennium Cell hydrogen generator produces high-purity hydrogen by the catalyzed reaction of water with dissolved sodium borohydride. Drawbacks of the sodium borohydride hydrogen generator include high cost of the sodium borohydride and the relatively short shelf life of the required aqueous solution of sodium borohydride.

Voller Energy of the UK offers a 100 W portable fuel cell system (Model VE100 V3) that incorporates a low-temperature (<85° C.) PEMFC that uses pure hydrogen delivered from a small canister. The system's drawback is that hydrogen fuel is very expensive and is considered hazardous, thereby subjecting it to shipping restrictions. Moreover, one canister provides only three hours of operation at 100 W.

IdaTech LLC of Bend, Oreg. has demonstrated a prototype 250 W fuel cell system based on a low-temperature (<85° C.) PEMFC that includes a methanol/water reformer. The IdaTech reformer also includes a hydrogen-selective membrane that yields a stream of high-purity hydrogen for fuel. The drawbacks of this design are its inherently high cost and complexity.

Portable DMFC products sold under Model Nos. A50 and C20-CP are made by Smart Fuel Cell AG of Brunnthal-Nord, Germany. The Model A50 is an autonomous battery charger rated at a maximum of 50 W and requiring a 12 V lead-acid battery. The Model C20-CP is a hybrid DMFC/Li-polymer battery that delivers a maximum of 20 W continuous and 36 W peak power. Both models include gas-liquid separators, the use of methanol/water mixtures with very low methanol concentrations, a water recovery/recycle subsystem and a microprocessor and methanol sensor combination to monitor, measure and control the methanol concentration. The chief drawbacks of such DMFC products is that they are very complex and expensive.

There is therefore a need for portable fuel cell systems that are affordable and that use simple and inexpensive liquid fuels. The present invention addresses these needs.

BRIEF SUMMARY OF THE INVENTION

The invention relates to a portable fuel cell system incorporating a fuel reformer that converts a liquid fuel to a hydrogen-rich reformate stream, a fuel cell stack that receives the reformate stream and operates at temperatures in the range of 100° C. to 250° C., an electrical circuit the regulates the voltage of output electrical power from the fuel cell stack and delivers the electrical power to at least one outlet; and associated components. The fuel cell system is preferably packaged in a case that is largely air-tight when closed and the entire system is sufficiently small in scale and lightweight to be carried with ease.

DETAILED DESCRIPTION OF PREFERRED EMBODIMENTS

As used herein, the term "about" when used in reference to a numerical value means the indicated numerical value+10% of that value.

Figure 1:
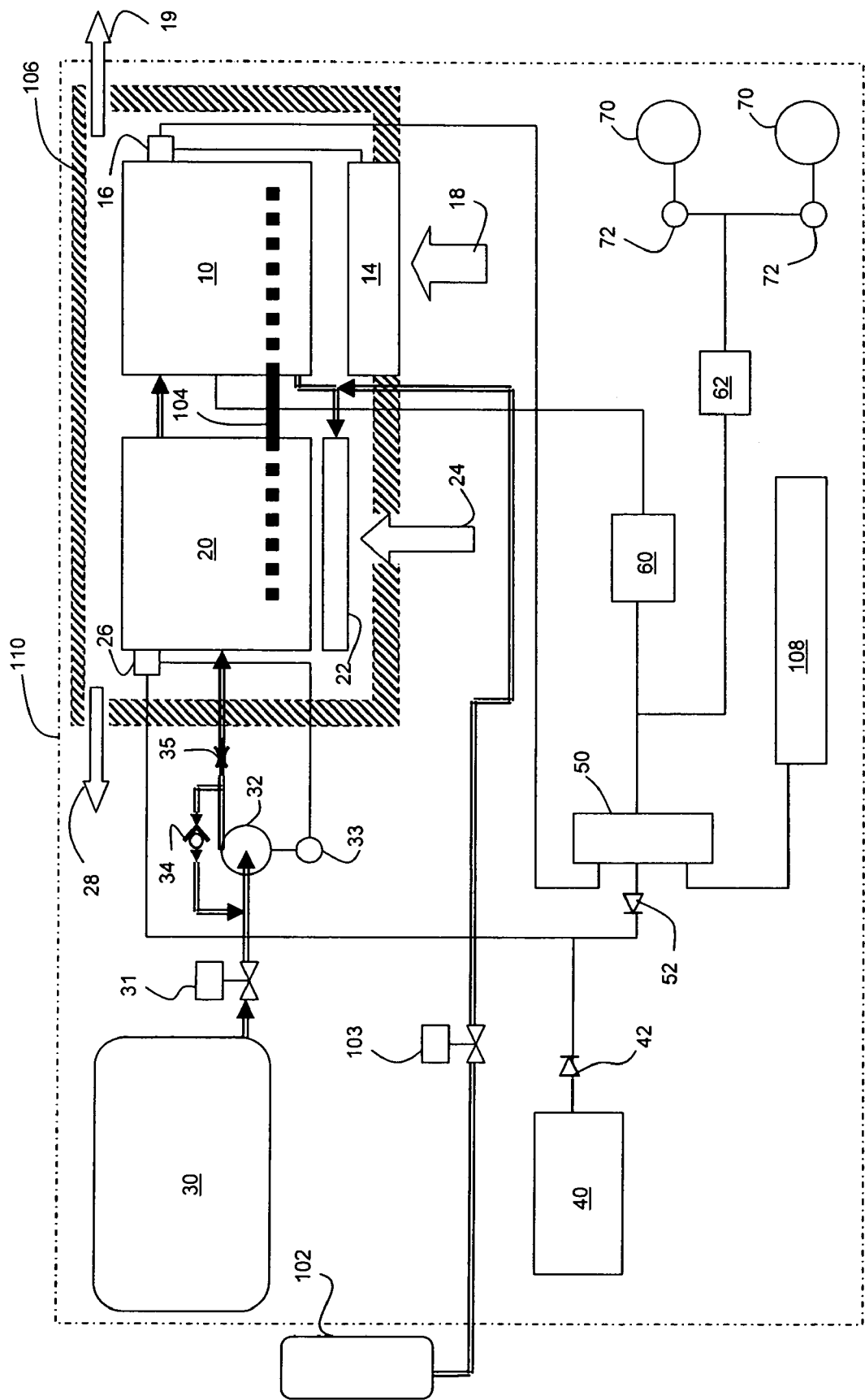
FIG. 1 is a schematic of an exemplary fuel cell system of the invention.

An exemplary embodiment of the invention is shown schematically in FIG. 1, the system comprising fuel cell stack 10, at least one fuel cell cooling fan 14, fuel cell thermal switch 16, fuel cell air feed 18 and fuel cell combustion exhaust duct 19. The system further comprises fuel reformer 20 operatively coupled to fuel cell stack 10, fuel reformer burner 22, fuel reformer air feed 24, fuel reformer thermal switch 26 and fuel reformer combustion exhaust duct 28. One or more heat pipes 104 pass from the vicinity of the fuel reformer burner 22 into the fuel cell stack 10. Fuel reformer 20 is fed fuel from fuel reservoir 30 via fuel reservoir shut off valve 31, fuel reservoir fuel pump 32, fuel pump switch 33, fuel check valve 34 and fuel feed orifice 35.

All of the system's components with the exception of a fuel tank 102 for supplying fuel to fuel reformer/fuel cell stack burner(s) are preferably contained within a substantially air-tight, openable system case 110. Within the case, fuel cell stack 10 and fuel reformer 20 and their associated heating and cooling components are preferably substantially surrounded by insulation 106.

The system is controlled in part by a simple electrical circuit comprising battery pack 40, battery pack diode 42, fuse box 50, fuse box diode 52, DC/DC voltage converter/regulator 60, circuit breaker 62, power outlets 70 and power outlet(s) switch(es) 72. A primary function of the electrical circuit is to couple the electrical power generated by fuel cell stack 10 to power outlets 70.

Fuel reservoir 30 contains a liquid fuel, preferably a mixture of methanol and water comprising from about 50 to about 60 wt % methanol, more preferably about 55 wt %, balance water. The fuel is pumped from fuel reservoir 30 into fuel reformer 20 by fuel pump 32. To ensure that the feed flow rate of the fuel is correct and not subject to fluctuations by the discharge flow rate of pump 32, pump 32 is preferably oversized by at least 10% and by as much as 50-fold, meaning that the discharge flow rate of pump 32 may be as little as 1.1 and as much as 50 times the required flow rate of fuel into fuel reformer 20.

Flow rate of fuel into fuel reformer 20 is regulated by a bypass loop comprising feed orifice 35 and check valve 34. Feed orifice 35 is sized to allow a restricted flow of fuel that matches the desired flow rate of fuel into reformer 20. Check valve 34 serves to maintain the desired pressure at the upstream side of feed orifice 35 since flow through the orifice is dependent on a predetermined pressure differential across the orifice. Both check valve 34 and feed orifice 35 are commercially available from O'Keefe Controls Company, Monroe, Conn. For example, a fuel flow rate into the reformer 20 of 1.9 mL/min may be achieved with an orifice 0.004 inch in diameter and a pressure differential across the orifice of 2 psig; a fuel flow rate of 5.2 mL/min into the reformer may be achieved with an orifice of 0.005 inch in diameter and a pressure differential of 5 psig; and a fuel flow rate of 15 mL/min into the reformer may be achieved with an orifice of 0.011 inch in diameter and a pressure differential of 2 psig.

Check valve 34 preferably has a cracking (or opening) pressure of from 0.01 to 10 psig to allow the use of low pressure pumps. The discharge side of check valve 34 is returned to the inlet side of pump 32 to complete a bypass loop. Alternatively, the discharge side of check valve 34 may be plumbed into the fuel reservoir (not shown). Preferably, the discharge side of check valve 34 is plumbed into the feed line between the downstream side of shut-off valve 31 and the inlet to pump 32, as shown in FIG. 1.

After passing through feed orifice 35, fuel flows into reformer 20. Reformer 20 is preferably heated to a temperature of from about 130° C. to about 450° C., as detailed below. Reformer 20 is preferably in the form of a tube that contains a catalyst that is formulated to accelerate the reaction of methanol and water in the liquid fuel to a product stream comprised predominantly of hydrogen, carbon dioxide, carbon monoxide, and water. Such a catalyst is commercially available from Süd-Chemie, Inc. of Louisville, Ky. The reformer need not function at a constant temperature. Indeed, it is preferred that the reformer operate over a range of temperatures such that the inlet of the reformer is at a higher temperature than its outlet. Preferred operating temperature ranges are: inlet 200° C.-700° C. and outlet 130° C.-250° C.; more preferably inlet 250° C.- 450° C. and outlet 150° C.-250° C.; even more preferably inlet 300° C.-450° C. and outlet 150° C.-250° C.; still more preferably inlet 200° C.-350° C. and outlet 130° C.-250° C.; and most preferably inlet 250° C.-350° C. and outlet 130° C.-200° C.

Reformer 20 preferably is operated at relatively low pressure (<10 psig) to reduce its mass, thereby reducing its cost. Because the reformer operates at relatively low temperatures and low pressures, it may be made of stainless steel, copper, and alloys containing copper. Although a tubular shape for the reformer is convenient and inexpensive, the reformer may be virtually any other shape, including rectangular. The reformer may be a single tube or rectangular channel, or it may be multiple tubes or rectangular channels arranged for parallel flow of the fuel feed stream.

Reformer 20 is preferably heated directly by a reformer burner 22 in close proximity to the reformer so that the hot combustion gases therefrom are directed at the reformer, preferably from 1 to 3 inches below the reformer. Fuel for reformer burner 22 preferably comprises waste anode gas from fuel cell stack 10. One embodiment of reformer burner 22 is a pipe made of stainless steel or copper, between 0.25 and 1 inch in diameter, and incorporating a series of small holes 0.01 to 0.10 inch in diameter, or slots 0.01 to 0.10 inch wide and up to 1 inch in length, arranged in a linear pattern along one side of the heat pipe. Alternatively, a single narrow slot 0.01 to 0.10 inch wide may be incorporated into reformer burner 22 instead of linear arrays of holes or slots. The waste anode gas fuel is discharged upwardly through such holes or slots and burns as it mixes with combustion air 24.

Figure 2:
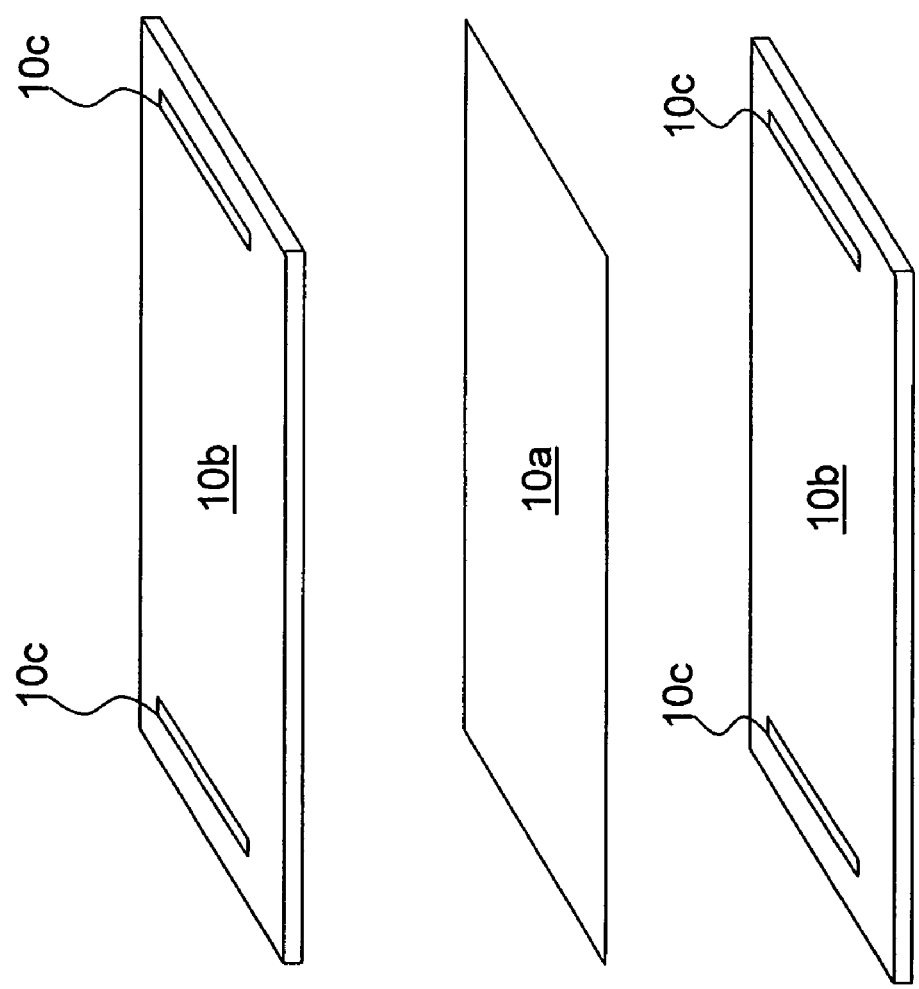
FIG. 2 is a schematic of an exemplary fuel cell stack of the invention.

Hydrogen-rich reformate that exits fuel reformer 20 is still hot (preferably 130° C.-200° C.) as it flows directly into the anode side of fuel cell stack 10, shown in FIG. 2. Fuel cell stack 10 consists of membrane electrode assembly (MEA) 10*a*, comprising an anode and a cathode, the MEA being sandwiched between bipolar plates 10*b*, with slits 10C forming a reformate manifold through which reformate is fed to the anode side of the MEA. Inside fuel cell stack 10, hydrogen from the hydrogen-rich reformate gas stream reacts at the anode and oxygen from fuel cell air feed 18 reacts at the cathode. The result is electricity, with byproducts heat and water. Not all of the hydrogen is consumed at the fuel cell anode because an excess of hydrogen-rich reformate is supplied to the anode, thereby ensuring that there will be fuel gas for reformer burner 22.

Fuel cell stack 10 preferably operates at a temperature within the range of from about 100° C. to about 250° C., more preferably from about 140° C. to about 200° C. Suitable membrane-electrode assemblies for this range of operating temperatures are commercially available from Pemeas Fuel Cell Technologies of Frankfurt, Germany as Celtec®-P Series 1000. As noted, fuel cell stack 10 produces heat as a byproduct of the generation of electrical power. Under typical operating conditions, the total fuel cell energy output (electrical power plus heat) is on the order of 50%-60% electricity and 40%-50% heat. Thus, once the fuel cell has been heated sufficiently to produce electrical power, it is self-sustaining and even must be cooled to maintain an acceptable operating temperature.

One or more cooling fans 14 are located in proximity to fuel cell stack 10 to cool the same by blowing air over it when it is operating. Preferably cooling fan(s) 14 are located beneath the fuel cell so that cooling air is blown upward over cooling fins located within the fuel cell. To maintain adequate temperature regulation of the fuel cell the fans are switched on and off in response to a temperature-responsive control device such as a thermal switch; an exemplary commercially available thermal switch is Model 49T bimetal thermal switch from Thermo-O-Disc, Inc. of Mansfield, Ohio. The thermal switch is normally open and closes upon heating when the set-point temperature is reached. Upon cooling from a hot state in which the thermal switch is closed, the switch opens when the temperature of the switch falls below the set-point temperature. Another example of a temperature-responsive control device is a thermocouple in combination with a suitable electrical circuit that interprets the thermocouple reading as a temperature relative to a set-point temperature, activating or deactivating a relay or switch in response to the sensed temperature to turn on or turn off the cooling fan(s).

The fuel cell stack is preferably configured so that the cooling air serves two purposes: it dissipates heat from the fuel cell stack during operation and it flows over the cathode to provide oxygen to the cathode, known as an open cathode fuel cell. An advantage of orienting the fuel cell so that the cooling fan(s) are below the fuel cell and blow air vertically up through the fuel cell's cooling channels is that this orientation promotes convective air flow through the cooling channels and over the cathode even when the cooling fan(s) are not operating. Thus, even if the fuel cell is at a temperature that is below the set-point temperature at which the cooling fan(s) would turn on, air will still flow by thermal convection over the cathode, thereby providing necessary oxygen to the cathode.

Because the fuel reformer and the fuel cell stack operate at temperatures substantially above normal ambient temperatures, they are preferably enclosed in an insulated enclosure to reduce heat loss to the surrounding environment; the insulated enclosure in turn is preferably fitted within a box or case (the system case). The insulated enclosure is generally cubic or elongated cubic in shape, although it may also be more generally cylindrical in shape. The insulated enclosure has a top, a bottom, and is surrounded by sides completely around its perimeter. The insulated enclosure is preferably fitted with one or more openings in its bottom to admit air into the enclosure for the dual purpose of providing combustion air to the reformer burner and cooling air to the fuel cell stack. Combustion exhaust from the reformer burner must be exhausted from the insulated enclosure, and cooling air, after passing through the fuel cell stack, must also be exhausted from the insulated enclosure. These combined exhaust streams are preferably allowed to exhaust through one or more openings generally located at or near the top of the insulated enclosure.

The size and dimensions of the openings to admit air into the enclosure and to allow exhaust from the enclosure are preferably designed to provide for an acceptably low pressure drop but at the same time not allow excessive heat to escape the enclosure. In one embodiment, the interior dimensions of the insulated enclosure surrounding the fuel reformer and the fuel cell stack is approximately 10×10×6.5 inches high. Other dimensions may be suitable, depending on the size and shape of the fuel reformer and the fuel cell stack. The thickness of insulation on the walls of the enclosure preferably ranges from 0.25 to 2 inches, with 0.5 to 1 inch being most preferred. The thickness of insulation on the bottom of the enclosure preferably ranges from 0.1 to 1 inch, with 0.25 to 0.5 inch being most preferred. The thickness of insulation on the top preferably ranges from 0.05 to 1 inch thick, with 0.1 to 0.25 inch thick being most preferred. Exemplary dimensions for the opening below the fuel reformer are about 1-2 inches×5-7 inches. Exemplary dimensions for the opening below the fuel cell stack are about 2.5-3.5 inches×5-7 inches. Exemplary dimensions for opening(s) at or near the top of the insulated enclosure to allow for exhaust from the enclosure are 2.5-3.5 inches×5-7 inches; 1-2 inches×5-7 inches; 0.5-1 inch×7-10 inches; or combinations of one or more openings of these approximate dimensions.

As noted above, the entire fuel cell system is contained within the system case that, when closed, is more or less airtight. The system case must be opened in order to operate the fuel cell since air must flow freely into and out of both the fuel reformer and the fuel cell stack during operation. However, when the fuel cell stack is not operating, it must be protected from ambient air since the membrane-electrode assembly is hygroscopic and can be damaged by absorbing moisture from the air. In addition, the membrane of the membrane-electrode assembly may be damaged by exposure to atmospheric pollutants such as dust and hydrocarbons.

The system case is indicated schematically in FIG. 1 as the dashed line 110 surrounding all of the fuel cell system components. The fuel reservoir may be contained within the system case or be external to the system case. An exemplary airtight system case is Storm Case model iM2600 from Storm Case, Inc. of South Deerfield, Mass. The system case preferably has a hinged lid that securely closes and seals out air when the case is closed. To operate the fuel cell system, the system case lid must be opened and remain open during operation. The insulated enclosure containing the fuel reformer and the fuel cell stack is preferably elevated slightly above the bottom of the system case by, e.g., about 0.1-1 inch, more preferably 0.25-0.5 inch, so as to provide an opening for air to be drawn into the opening beneath both the fuel reformer and the fuel cell stack.

In addition to the aforementioned fuel pump and fuel cell cooling fan(s) other electromechanical, mechanical, and electrical components are required for the operation of the fuel cell system, as described below.

FIG. 1 also includes a schematic of an exemplary electrical circuit. A DC/DC voltage regulator 60 is required to convert the unregulated voltage output from fuel cell stack 10 to a commercially important, regulated voltage such as nominal 12 V DC. Typical commercial 12 V DC appliances and products are designed to operate from an automotive 12 V battery. These appliances and products are designed to operate at a voltage that falls within the nominal voltage limits for a 12 V battery which is 10.8 V to 14.4 V. The unregulated voltage output from the fuel cell is passed into the DC/DC voltage converter 60 that puts out voltage within this range of 10.8 V to 14.4 V. An example of a suitable commercially available DC/DC voltage converter/regulator is Model LVBM-12V from Sierra West Power, Inc. of Los Cruces, N. Mex.

Because DC/DC converters get hot when operated, internal cooling within the system case is beneficial. A case cooling fan 108, or multiple case cooling fans, may be incorporated into the system for cooling the DC/DC converter/regulator. The DC electrical power from the DC/DC voltage converter/regulator is preferably connected to one or more power outlets 70 via a suitable circuit protection device such as a circuit breaker 62 or a fuse. Power outlet(s) 70 may be any commercial device that the user may plug appliances into. One exemplary suitable power outlet is a cigarette-lighter style such as is commonly found in automobiles and recreational boats. Power outlet(s) may be further controlled by one or more user-activated manual switch(es) 72, whereby electrical power is delivered to the outlet(s) only when the user turns on the switch(es). A user-activated manual switch 33 may also be used to control the delivery of electrical power to fuel pump 32. The system's pump and fans are protected against current overload by appropriately sized electrical fuses contained in fuse box 50.

A battery pack 40 preferably holds a sufficient number of primary or secondary batteries to power the fuel pump during start-up. For example, the battery pack may contain eight AA batteries delivering nominal 12 V DC to power the fuel pump during start-up. Alternatively, C or D cells could also be used, either as primary cells or rechargeable cells. The electrical circuit is preferably designed so that the battery pack cannot be charged when the fuel cell is in operation so primary batteries may be safely used. This feature is achieved by incorporating a diode 42 in the electrical line from battery pack 40. However, if battery pack 40 comprises secondary batteries then a battery-charging circuit is preferably coupled to battery pack 40, in which case diode 42 would be omitted from the circuit. Also, since the battery pack is not designed to provide power to the user's appliances, a second diode 52 is placed in the fuel cell electrical line that connects to the fuel pump, thereby blocking electrical power from the battery pack from reaching the power outlet(s).

During start-up, the fuel pump is initially off, and it is designed to remain off until the fuel reformer has been heated to at least a minimum threshold temperature. For example, depending on the catalyst used in the fuel reformer, the minimum threshold temperature may be anywhere between about 125° C. and about 300° C., preferably from about 125° C. to about 250° C., more preferably from 125° C. to 200° C., still more preferably from 150° C. to 225° C., and most preferably from 130° C. to 170° C. A temperature-responsive control device is used to detect when the fuel reformer has reached the minimum threshold temperature and then turn on the pump—this is done automatically so the user does not have to monitor the temperature of the fuel reformer during start-up. As previously mentioned, an example of such a temperature-responsive control device is the Model 49T bimetal thermal switch from Thermo-O-Disc, Inc. The thermal switch is normally open and closes upon heating when the set-point temperature is reached to turn on the fuel pump. Upon cooling from a hot state in which the thermal switch is closed, the switch opens when the temperature of the switch falls below the set-point temperature. Another example of a temperature-responsive control device is a thermocouple in combination with a suitable electrical circuit that interprets the thermocouple reading as a temperature relative to a set-point temperature, activating a relay or switch in response to the sensed temperature to turn on the fuel pump.

Figure 3:
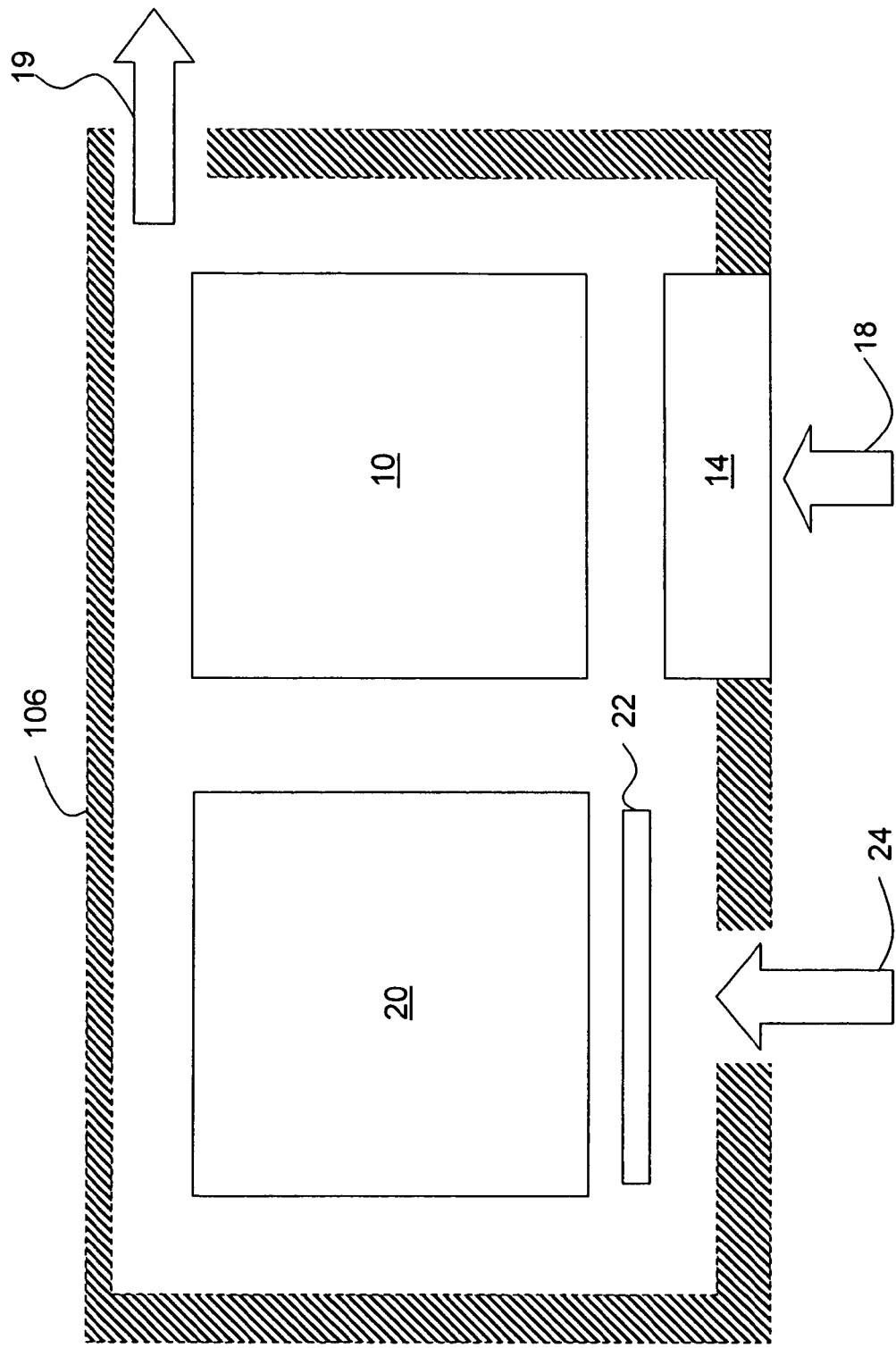
FIGS. 3-9 are schematics of other exemplary arrangements for heating the fuel cell stack of the invention.
Figure 4:
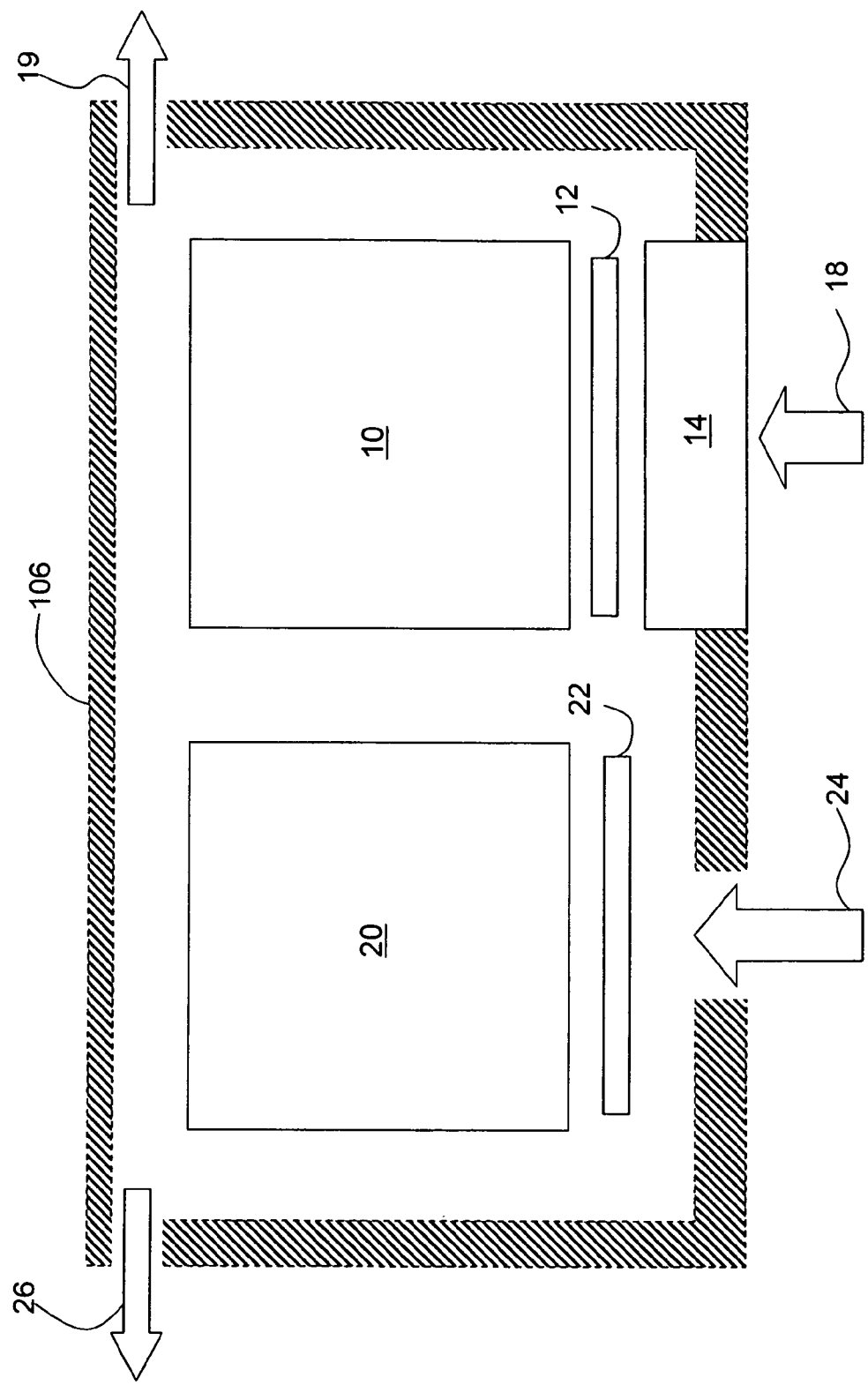
Figure 5:
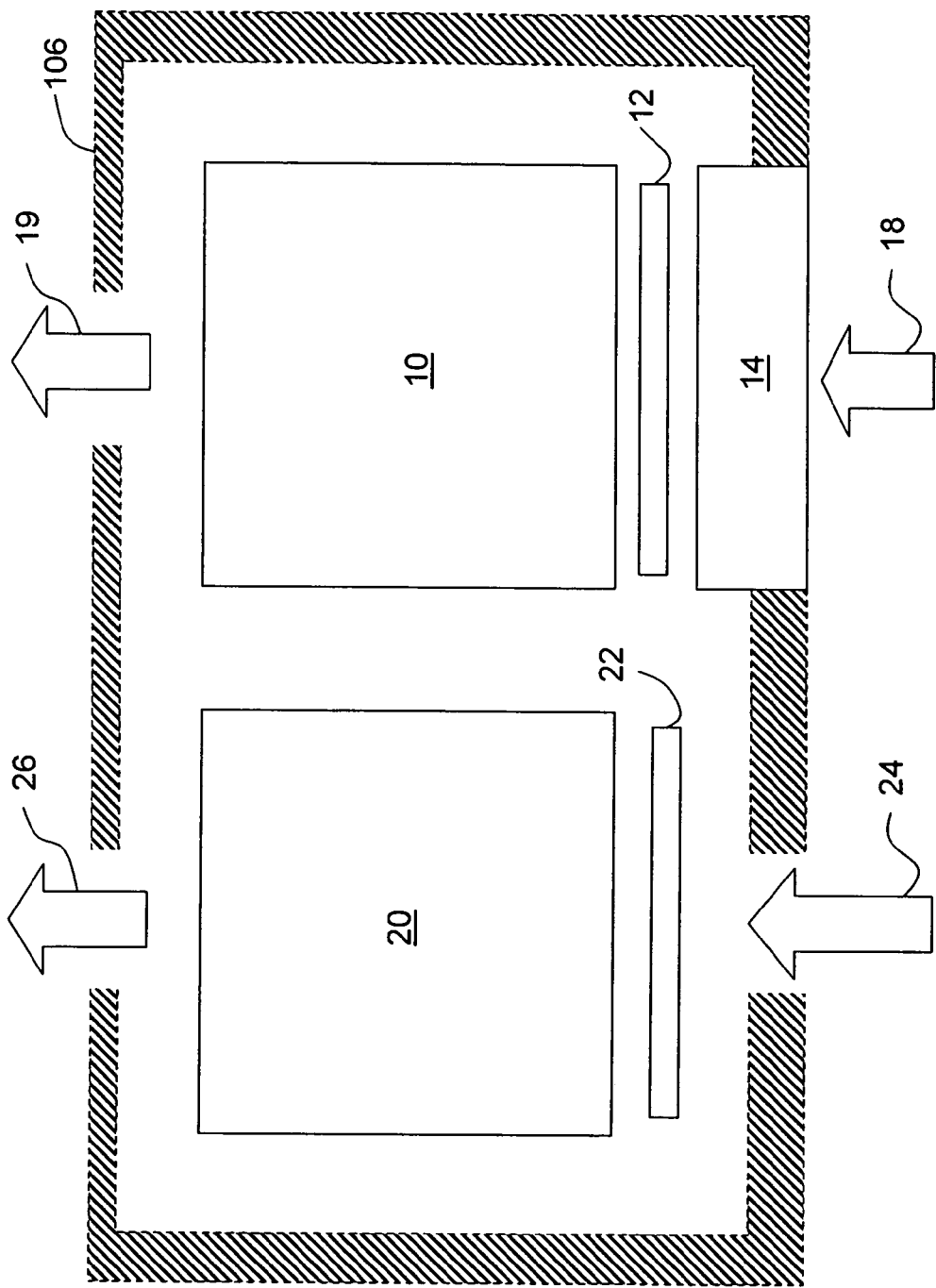

Several different embodiments of the insulated enclosure containing the fuel reformer and the fuel cell stack are shown in FIGS. 3-5. In FIG. 3, the air 24 for the reformer burner 22 is drawn in from an opening below the burner. Air 18 for cooling fuel cell 10 and for the fuel cell's cathode is drawn in from an opening below fuel cell cooling fan(s) 14. Exhaust 19 is expelled from a single opening located near the top of the insulated enclosure and in proximity to the fuel cell stack. This arrangement allows for hot combustion gases to pass over a portion of the fuel cell stack to help heat it during start-up when it is likely to be below its operating temperature. Exhaust 19 is shown in FIG. 3 exiting through the top side of the insulated enclosure, but it could also exit upward through an opening in the top of the insulated enclosure.

FIG. 4 shows essentially the same configuration as FIG. 3 except a burner 12 is shown below fuel cell stack 10 for heating the fuel cell during start-up when the fuel cell is at a temperature less than its desired minimum operating temperature. As mentioned above, the desired minimum operating temperature of the fuel cell stack is preferably between about 100° C. and about 140° C., more preferably about 130° C. Any convenient fuel may used to fire the burner. An especially preferred fuel that is widely available and portable is propane packaged in disposable cylinders. The exhaust is shown on FIG. 4 exiting through the top sides at two locations, although it could also exit through only one port or more than two ports, or through one or more openings in the top of the insulated enclosure, as shown in FIG. 5.

Figure 6:
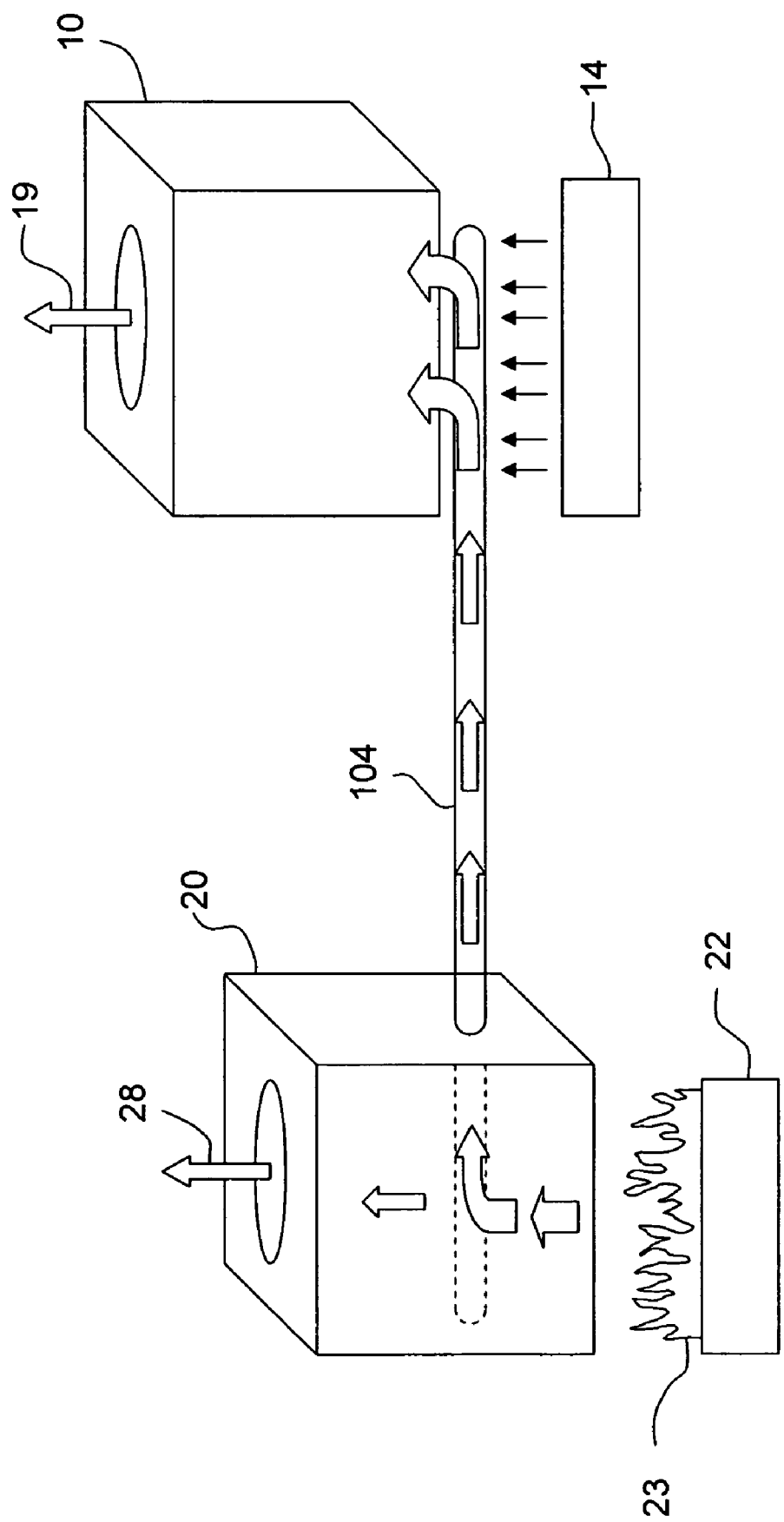

FIG. 6 shows air inlet and exhaust openings similar to those shown in FIG. 4, as well as a preferred means for heating fuel cell stack 10 during start-up. One or more heat pipes 104 extend from fuel reformer 20 to fuel cell stack 10. The basic construction of a heat pipe is an evacuated tubular pipe containing a small amount of a fluid such as water and sealed at its ends. Exemplary suitable heat pipes are made of copper and contain the small amount of water in the liquid and vapor phases in equilibrium.

Another advantage of heat pipes for heating the fuel cell stack during start-up is that they are completely passive and have no moving parts to wear out. Heat pipes are also quiet, small, lightweight, and do not require any active control. Such heat pipes are commercially available from, for example, Thermacore, Inc. of Lancaster, Pa. and Furukawa America, Inc. of Santa Clara, Calif. Such heat pipes are particularly useful for transferring heat from one location to another due to their exceedingly high thermal conductivity. One end of the heat pipe(s) is heated in or near reformer burner 20, conducting heat to its distal end to either the underside or the inside of fuel cell stack 10, as schematically shown in FIG. 5, wherein arrows indicate the direction of heat flow from a region of high temperature in the vicinity of the reformer burner flame 23 to a region of cooler temperature in the vicinity of fuel cell stack 10. Common diameters for heat pipes include 3 mm, 4 mm, 6 mm, 8 mm, 9.5 mm, and 12.7 mm. Generally speaking, the larger the diameter of the heat pipe, the more heat it will conduct. For example, Thermacore rates the typical heat conduction of its heat pipes as follows: for 3 mm, 10 W; 4 mm, 17 W; 6 mm, 40 W; 8 mm, 60 W; 9.5 mm, 80 W, and 12.7 mm, 120 W.

The number of heat pipes that are used to heat the fuel cell stack during start-up is a function of (1) the mass and heat capacity of the fuel cell stack, (2) the desired start-up time (or time to heat the fuel cell stack to its minimum operating temperature), and (3) the diameter of the heat pipe. As an example, the fuel cell stack of the inventive system may comprise 10 electrochemical cells, nine graphite bipolar plates, and two monopolar graphite end plates with a total mass of about 0.6 kg. About 61 kJ of heat will be required to heat the fuel cell stack from 15° C. to 150° C., assuming negligible heat loss. If the total desired time to heat the fuel cell stack to 150° C. is 5 minutes, the required heat input will be 61 kJ÷300 sec, or 203 W. However, if the desired time to heat the fuel cell to 150° C. is 2 minutes, then the heat input needs to be 61 kJ÷120 sec, or 508 W.

One design solution to deliver approximately 203 W to the fuel cell stack is to use five 6 mm heat pipes (5×40 W/heat pipe=200 W). Alternatively, three 9.5 mm diameter heat pipes would also deliver sufficient heat to the stack (3×80 W/heat pipe=240 W). Or, 20 3 mm heat pipes could be used (20×10 W/heat pipe=200 W).

Figure 7:
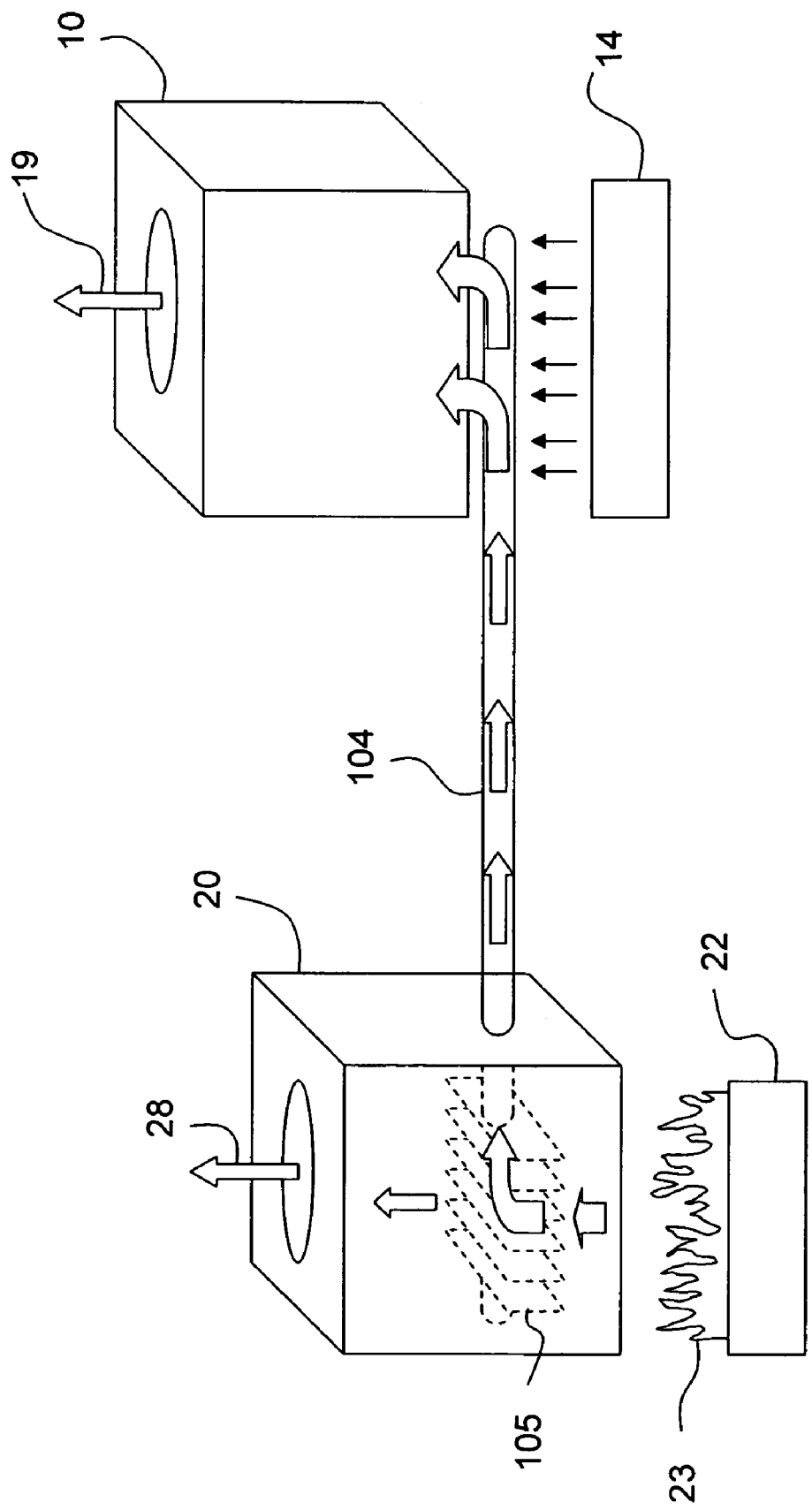
Figure 8:
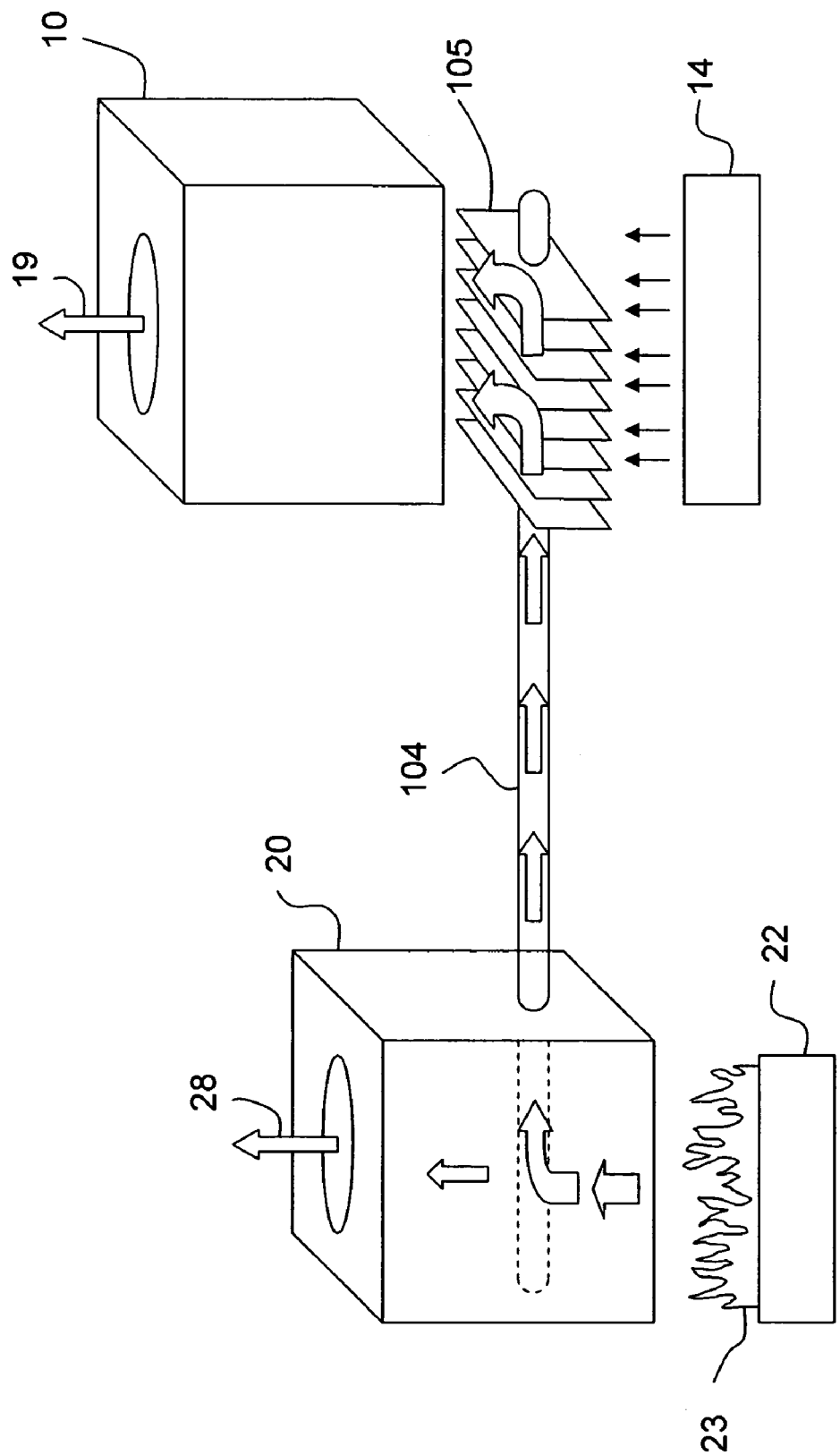

FIG. 7 shows another embodiment of the invention using one or more heat pipes 104 to heat the fuel cell stack. However in this case the heat pipe(s) are located immediately beneath and outside of fuel cell stack 10 and air is blown over the heat pipes, whereby the air is heated prior to flowing over the fuel cell stack. This embodiment may be especially advantageous when large diameter heat pipes are used since the incorporation of large diameter heat pipes inside fuel cell stack 10 may disrupt the fuel cell stack's functional design, for instance, by blocking or restricting air flow through one or more of the cathode-side air channels. Optionally, metal heat dissipation fins 105 as shown in FIG. 8 may be coupled to the heat pipe(s) at the end nearest the fuel cell stack to increase the surface area for heat dissipation into the flowing air stream passing over the heat pipe(s).

Figure 9:
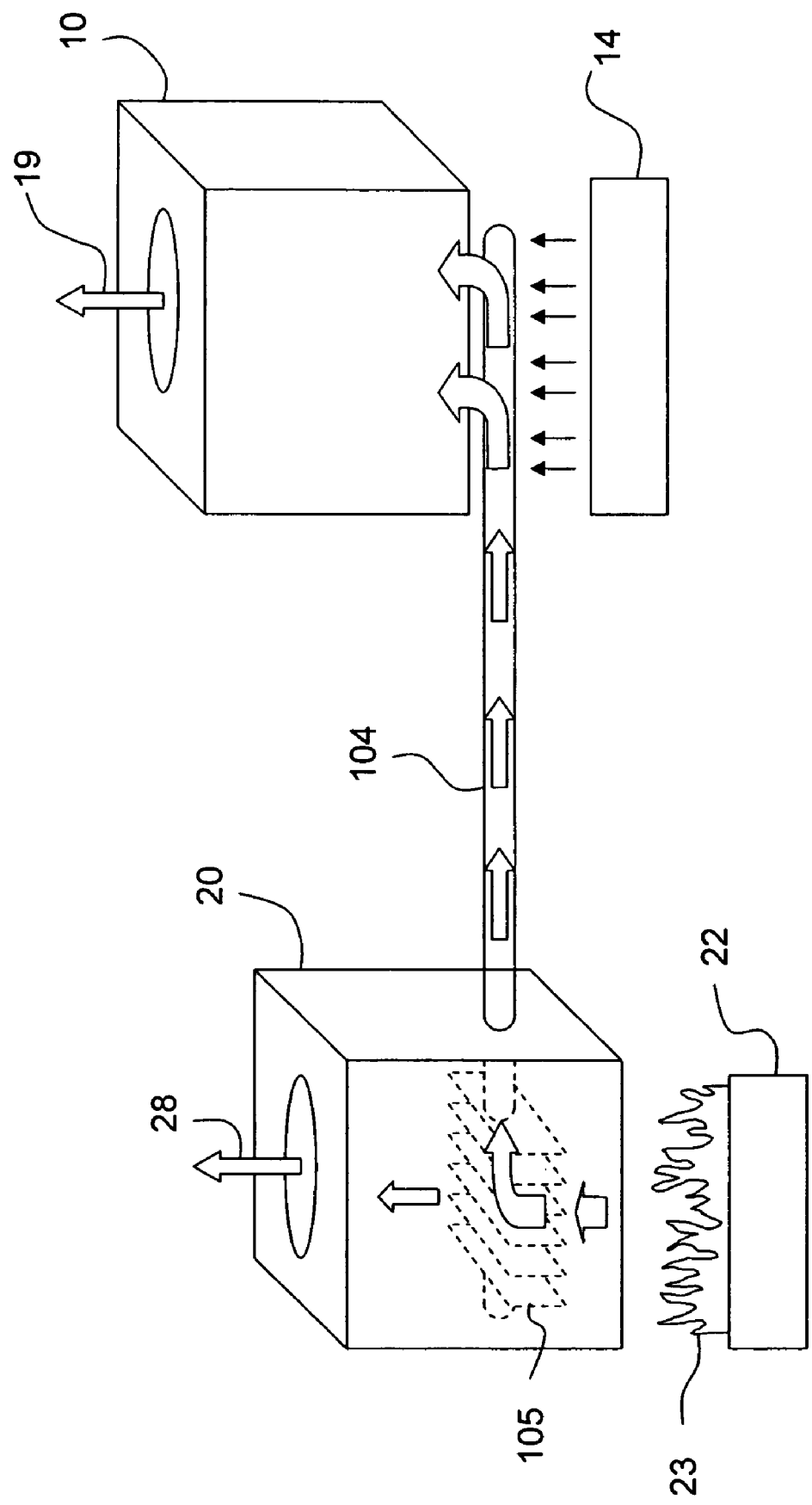

Metal fins 105 may instead be coupled to the end of the heat pipe(s) that is heated by reformer burner 20 to increase the heat transfer rate from the combustion in the burner to the fuel cell stack, as depicted in FIG. 9. The heat pipe(s) need not be placed directly in the reformer burner flame, but may be positioned appropriately in the hot combustion gases in the vicinity of the reformer burner. This flexibility allows for the placement of the heat pipe(s) at a suitable location to realize the desired temperature without overheating or underheating them.

As previously mentioned, both fuel reformer 20 and fuel cell stack 10 must be heated during start-up. This may be accomplished by using a combustible fuel such as commercially available propane gas or LPG, preferably when the same is packaged in a small container such as a 16-ounce disposable cylinder commonly used by campers. FIG. 1 illustrates an exemplary method for using propane as a start-up fuel. A cylinder of propane 102 is connected to the fuel cell system using commercial fittings. A valve 103 (solenoid or manual) is normally closed to isolate the propane cylinder and prevent flow of propane to the fuel reformer burner and/or fuel cell stack burner. To begin flow of propane to the burner (s), valve 103 is opened. The propane gas exiting reformer burner 22 is lit using a suitable ignition source such as a match, a lighter, an electrical spark or a hot surface igniter. An ignition port in the side of the fuel cell system case (not shown) provides direct access to the burner(s) for manual ignition using a match or lighter. The ignition port need not be more than about 2 inches in diameter or less than about 0.5 inch in diameter. To maintain the airtight qualities of the fuel cell system when it is not in operation, the opening is preferably covered with a solid plate of sufficient dimensions to completely cover it. The plate may be composed of metal or plastic. A gasket around the perimeter of the opening provides a seal between the plate and the case. The plate may be spring-loaded so as to bias the plate to snug up to the gasket, or a mechanical or magnetic fastener may serve to hold the plate closed against the gasket.

Another means for heating the fuel reformer and fuel cell stack at start-up is by electrical resistance heating elements. A battery or battery pack or other source of electrical power such as from an automobile or a boat could provide the electrical power required to cause the heating elements to become hot. The battery or battery pack may be either internal or external to the fuel cell system, and most preferably comprises rechargeable cells. The electrical resistance heating elements may be of any convenient and available shape, but an especially preferred shape is a rod approximately 0.25 to 0.5 inch in diameter, commercially available from McMaster-Carr, Inc. of Los Angeles, Calif. In the case of the fuel cell stack, one or more heating elements may be inserted into the fuel cell stack so that when energized, the heating elements become hot and transfer this heat directly into the fuel cell stack.

If the fuel reformer is a tubular reformer, the most effective way to heat it is to place a block of aluminum, copper, steel, etc., around at least a portion of the tubular reactor. Into this block of metal are inserted one or more heating elements. If the reformer is planar, then the heating elements may be planar or, if they are cylindrical, they may be inserted into a metal block that is in contact with at least one surface of the reformer. A thermocouple or other temperature sensor is employed to determine when the fuel cell stack and the fuel reformer have been heated to at least their respective threshold start-up temperatures. Once the threshold temperatures are reached, the electrical power to the heating elements(s) is shut off. Ideally, the thermocouple or temperature sensor is inserted into the metal block of the reformer and/or into the fuel cell stack. Alternatively, the thermocouple or temperature-indicating sensor may be affixed to the surface of the metal block of the reformer or to another location on the reformer that is at a temperature that is representative of the reformer's temperature and/or to the surface of the fuel cell stack.

The fuel cell system preferably uses a liquid fuel that is composed of predominantly methanol and water. Typically, a 1:1 molar ratio of methanol and water (64 wt % methanol and 36 wt % water) makes up the feed stream for reforming to generate hydrogen since this composition gives the maximum yield of hydrogen per volume of fuel mix. However, it has been discovered that in order to achieve a reformate product stream from the fuel reformer with <1 vol % carbon monoxide (CO) it is preferred that the fuel mix comprise predominantly <60 wt % and most preferably ≦55 wt % methanol. In the specific case where the fuel mix is 55 wt % methanol and 45 wt % water, the water-gas-shift equilibrium equation, which governs the equilibrium CO content in the product reformate stream, predicts that the reformate will contain 0.7 vol % CO at 200° C. However, if the fuel mix contains 64 wt % methanol, the equilibrium CO concentration in the reformate stream will be much higher, or approximately 2.9 vol % CO. However, as the methanol concentration is reduced, the amount of hydrogen that can be produced from a given amount of fuel mix becomes less. Therefore a practical minimum concentration of methanol in the fuel mix about is 35 wt %.

The fuel mix further contains additives in low concentration to make the fuel mix safer. Since methanol is poisonous to humans and animals if ingested, the fuel mix preferably contains Bitrex® (denatonium benzoate) at about 10 to 100 ppm, more preferably about 30 ppm, which renders the fuel mix extremely bitter-tasting. The fuel mix also preferably contains a dye that colors the fuel so that it is easily distinguishable from water. It is important that the dye be soluble in the methanol/water fuel mix and furthermore that the dye not leave significant residue upon evaporation in the fuel reformer or immediately prior to the fuel reformer where fuel vaporization occurs so as to avoid blockage of the fuel feed line to the reformer. Most water-soluble dyes are sodium salts, and these leave large quantities of undesireable residue upon evaporation. It has been discovered that fluorescein ($C_{20}H_{12}O_5$, CAS No. 2321-07-5) is sufficiently soluble in the fuel mix to impart an intense yellow-green color, yet leaves little if any residue when evaporated at the fuel reformer. The concentration of fluorescein may be from 5 ppm to 1250 ppm depending on the intensity of color that is desired.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

The invention claimed is:

1. A portable fuel cell system comprising the following components arranged in a lightweight, openable and substantially airtight case:
  (a) a membrane-electrode assembly operable at 100.degree. C. to 250.degree. C. and capable of generating 100 W to 500 W electrical power and having a cathode in fluid communication with ambient air;
  (b) a fuel reformer capable of producing a hydrogen-rich, carbon monoxide-poor product stream from fuel;
  (c) a fuel container containing said fuel for said fuel reformer, said fuel comprising a mixture of methanol and water;
  (d) a fuel pump for feeding said fuel to said fuel reformer;
  (e) means for heating said fuel reformer to a temperature of from about 200.degree. C. to about 700.degree. C.;
  (f) at least one fan for cooling said membrane-electrode assembly;
  (g) at least one electrical power outlet adapted to receive and dispense the electrical power generated by component (a); and (h) an electrical circuit coupling components (a), and (d)-(g) and coupling the electrical power generated by component (a) to component (g), wherein component (a) is heated to its operating temperature by means of at least one heat pipe located between component (a) and a heat source, and said heat pipe is in fluid communication with components (a) and (b).

2. The fuel cell system of claim 1 wherein said fuel comprises a mixture of 35-65 wt % methanol, balance water.

3. The fuel cell system of claim 2 wherein said methanol is present in said fuel at a concentration of 35-55 wt %.

4. The fuel cell system of claim 3 wherein said fuel further comprises 5-1000 ppm fluorescein.

5. The fuel cell system of claim 4 wherein said fuel further comprises 5-50 ppm denatonium benzoate.

6. The fuel cell system of claim 1 wherein said heat pipe and said heat source are located below component (a).

7. The fuel cell system of claim 6 wherein component (f) is located below said heat pipe and said heat source.

8. The fuel cell system of claim 1 wherein component (e) comprises a propane burner.

9. The fuel cell system of claim 8 wherein components (a) and (b) are substantially surrounded by insulation and are each provided with respective ambient air intakes and exhaust ports.

10. The fuel cell system of claim 8 wherein said propane burner is in fluid communication with a propane-containing vessel and an ignition port.

11. The fuel cell system of claim 10 wherein component (c) is provided with a shutoff valve and component (d) is provided with an on/off switch and a check valve.

12. The fuel cell system of claim 11 wherein said heat source for component (a) and component (f) are each operatively coupled to a respective thermal switch.

13. The fuel cell system of claim 12 wherein component (d) is provided with electrical power to the same by a battery pack.

14. The fuel cell system of claim 1 wherein component (h) includes a DC/DC voltage converter/regulator capable of delivering nominal 12 V electrical power to component (g).

15. The fuel cell system of claim 1 wherein the means for heating is an electrical resistance heater for heating components (a) and/or (b) at start-up of said system.

16. The fuel cell system of claim 15 wherein said electrical resistance heater is provided with electrical power by a source selected from a battery and battery pack.

17. The fuel cell system of claim 1 wherein a quantity of the at least one heat pipe is determined based on criteria in the group consisting of: mass and heat capacity of the membrane-electrode assembly; a desired start up time; a diameter of the at least one heat pipe; and combinations thereof.

18. A portable fuel cell system comprising:
a membrane-electrode assembly for generating electrical power;
a fuel reformer for producing a hydrogen-rich, carbon monoxide-poor product stream for the membrane-electrode assembly from fuel;
a fuel container assembly for providing fuel to the fuel reformer;
a heating element for heating the fuel reformer;
a heat source; and
at least one heat pipe located between the membrane-electrode assembly and the heat source for transmitting heat to the membrane-electrode assembly during start up, wherein the at least one heat pipe is in fluid communication with the membrane-electrode assembly and fuel reformer.

19. The portable fuel cell system of claim 18 wherein a quantity of the at least one heat pipe is determined based on criteria in the group consisting of: mass and heat capacity of the membrane-electrode assembly; a desired start up time; a diameter of the at least one heat pipe; and combinations thereof.

20. The portable fuel cell system of claim 18 further comprising a fan for cooling the membrane-electrode assembly.

* * * * *